(12) United States Patent
Ohlemeyer

(10) Patent No.: US 6,401,549 B1
(45) Date of Patent: Jun. 11, 2002

(54) HARVESTING MACHINE WITH THROUGHPUT MEASUREMENT DEVICE

(75) Inventor: Heinrich Ohlemeyer, Hille (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/492,237

(22) Filed: Jan. 27, 2000

(30) Foreign Application Priority Data

Jan. 29, 1999 (DE) .......................................... 199 03 471

(51) Int. Cl.⁷ ............................. G01F 1/30; A01D 75/28
(52) U.S. Cl. ................................. 73/861.73; 56/10.2 E; 56/10.2 G
(58) Field of Search ....................... 73/861.72, 861.73; 56/10.2 E, 10.2 G, 14.1, 16.413, 104

(56) References Cited

U.S. PATENT DOCUMENTS 5,795,221 A * 8/1998 Diekhans ................. 56/10.2 G
5,921,071 A * 7/1999 Paquet et al. ............. 56/10.2 J

FOREIGN PATENT DOCUMENTS

DE A-195 24 752 1/1997

OTHER PUBLICATIONS

"Investigations into the Mechanical Measurement of the Throughput on Self-propelled Forage Harvesters", Agrartechnik, 27 .Jg. issue 6, pages 265 and 266 (1977), by G. Ihle and W. Dornitz.

* cited by examiner

Primary Examiner—Harshad Patel

(57) ABSTRACT

A self-propelled forage harvester is provided with a throughput measurement device comprising a computer which makes use of respective signals representative of the displacement of a movable upper pre-compression roll relative to a fixed lower pre-compression roll, of the speed of the lower roll, and of the force exerted by the mat of crop passing between the rolls on the upper roll once the upper roll reaches its upper limit position in the calculation of the crop throughput value. An additional input signal that may be used in the calculation of the crop throughput is generated by a light barrier which determines whether or not any crop is exiting the discharge chute of the forage harvester, this signal causing the throughput calculation to indicate zero throughput when no crop is exiting and causing the calculation to indicate a minimum amount when the upper pre-compression roll is in its lower limit position with crop being sensed exiting the discharge chute.

14 Claims, 3 Drawing Sheets

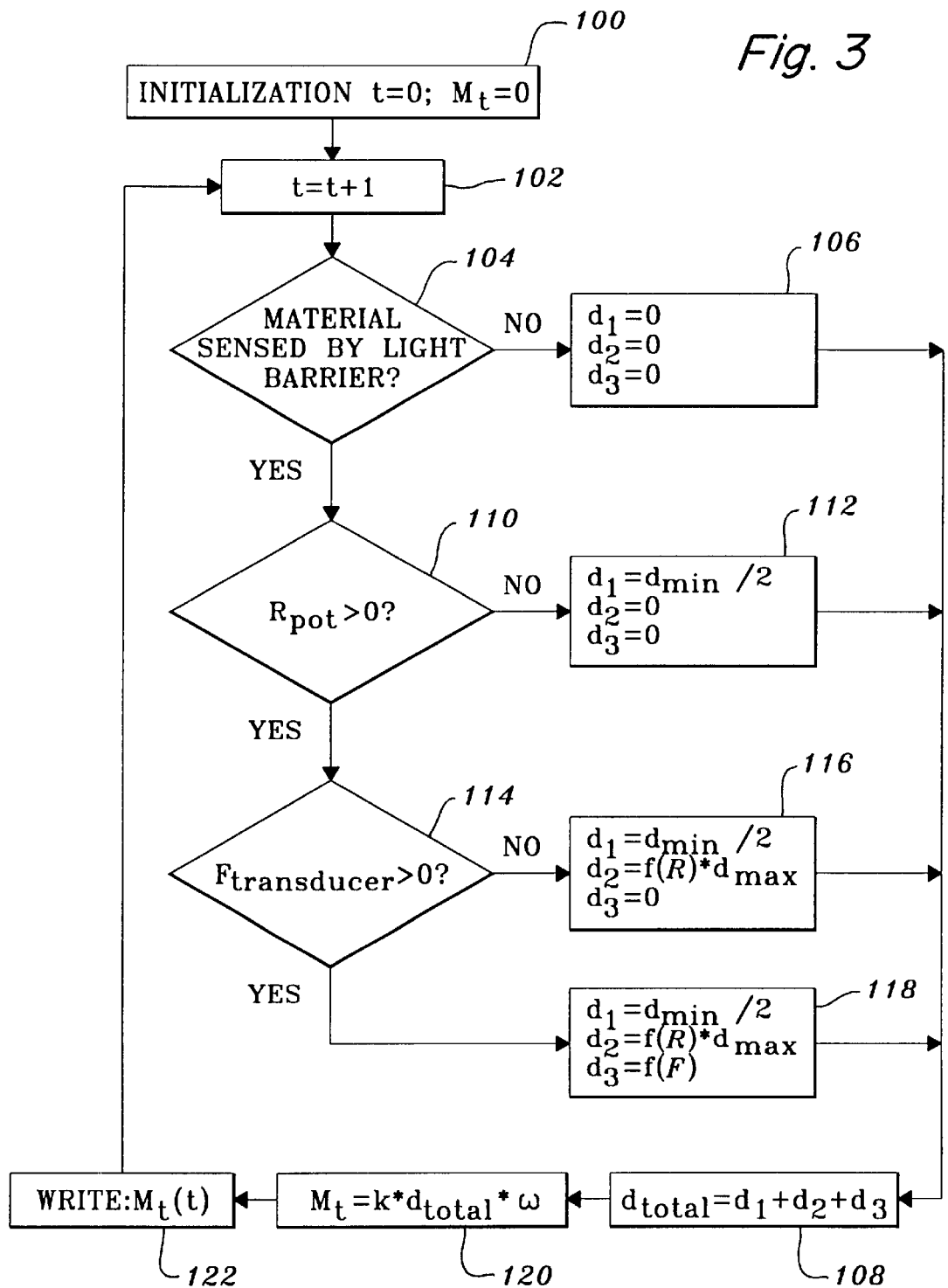

HARVESTING MACHINE WITH THROUGHPUT MEASUREMENT DEVICE

BACKGROUND OF THE INVENTION

The invention concerns a throughput measurement device for the determination of the crop throughput in an agricultural harvesting machine, in particular a forage harvester, where the harvesting machine is provided with at least one pair of pre-compression rolls that guide the crop and whose spacing varies on the basis of the current crop throughput between a minimum limit position and a maximum limit position. The throughput measurement device contains a spacing measurement arrangement that makes available signals corresponding to the spacing between the pre-compression rolls, a speed sensor, that makes available signals corresponding to the speed of the crop and a control unit that utilizes the spacing signals and the speed signals for the determination of actual mass throughput values. Furthermore the invention concerns a harvesting machine with a throughput measurement device and process for the measurement of throughput.

In the treatise by G. Ihle and W. Dornitz, "Investigations into the Mechanical Measurement of the Throughput on Self-propelled Forage Harvesters", Agrartechnik, 27.Jg. issue 6, 5. 265 (1977) describes a continuous throughput measurement process for a forage harvester. In the forage harvester, the crop is conducted from a take-up arrangement over a transfer roll and a forward belt to compression rolls and smooth rolls (that are characterized in the following also as pre-compression rolls), which compress the crop to a mat and provide a speed corresponding to the currently effective chopper length for the mat. In a chopper drum, the crop mat is cut into individual lengths which are ejected through a discharge pipe to a transport vehicle. The height of the crop mat is detected by device and is used for the calculation of the throughput, in which the pre-set intake speed is considered a constant. On the basis of the process shown, the variation of the throughput with time can be recorded. However, it does not deliver any throughput signals that could be stored electrically and would be available for further control processes.

DE-A-195 24 752 discloses an arrangement and a process for the measurement of the throughput on a forage harvester with a throughput measurement device. Here the vertical movement of a pre-compression roll is transmitted over a lever linkage to the axis of rotation of a potentiometer which delivers lift signals corresponding to the lift path. An inductive sensor generates a signal value derived from the rotational speed of a pre-compression roll, which represents the throughput speed of the flow of the crop flowing through the machine. The signal values are continuously calculated in a microprocessor into an absolute mass flow measurement value. In addition, signals of a torque measurement at the chopper drum and a slip measurement of the drive belt can be detected and used as correction values in regions of defined limit values in which a pre-compression roll approaches the upper or lower stops. It has, however, been found that these corrections in the regions of the upper and lower stops are highly prone to errors and require a large calibration effort. Furthermore the linkage realignment of the vertical movement of a pre-compression roll over a lever linkage to the axis of rotation of a potentiometer described in DE-A-195 24 752 delivers a relatively low resolution of the measured values since the potentiometer disclosed covers a relatively small range of angles of rotation.

The problem underlying the invention is seen as that of defining a throughput measurement device, a harvesting machine with a throughput measurement device and a process for determining the crop throughput of the aforementioned type, through which at least some of the aforementioned problems are overcome. In particular, the throughput measurement device should permit a reliable and precise determination of the mass flow of crop with the employment of relatively few sensors. In the application of the measurement process a consideration of dynamic machine data should not be required.

SUMMARY OF THE INVENTION

According to the present invention, there is provided a throughput measurement device for the determination of the mass flow of the crop through an agricultural harvesting machine, in particular a forage harvester, that is provided with a pair of pre-compression rolls that guide and compress the crop, whose spacing varies on the basis of the current crop throughput between a minimum limit position and a maximum limit position.

A broad object of the invention is to provide a very reliable crop throughput measuring arrangement that uses few, cost effective sensors and components in an unobtrusive design, with the capability of high resolution even in the region of maximum deflection of the movable pre-compression roll without necessitating any dynamic machine data to be incorporated into the evaluation.

A more specific object of the invention is to provide a throughput measurement device containing a spacing measurement arrangement, which detects the spacing between the pre-compression rolls and makes available corresponding spacing signals and a speed sensor that detects the speed of flow of the crop in particular in the region of a pre-compression roll, and makes available corresponding speed signals, the measurement device further including a control unit which calculates, from the distance signals and the speed signals, actual mass throughput values.

Another object of the invention is to provide a throughput measurement device, as set forth in the immediately preceding object, but which further includes at least one force transducer that is arranged and is effective only in the region of the maximum limit position of the movable pre-compression roll, to produce signals corresponding to the pressures on the stop, with the control unit making use of these force transducer signals into the determination of the actual mass throughput values.

These and other objects will become apparent from a reading of the ensuing description together with the appended drawings.

BRIEF DESCRIPTION OF THE DRAWINGS

FIG. 3 shows a flow diagram for the calculation of the mass flow rate.

DESCRIPTION OF THE PREFERRED EMBODIMENT

Figure 1:
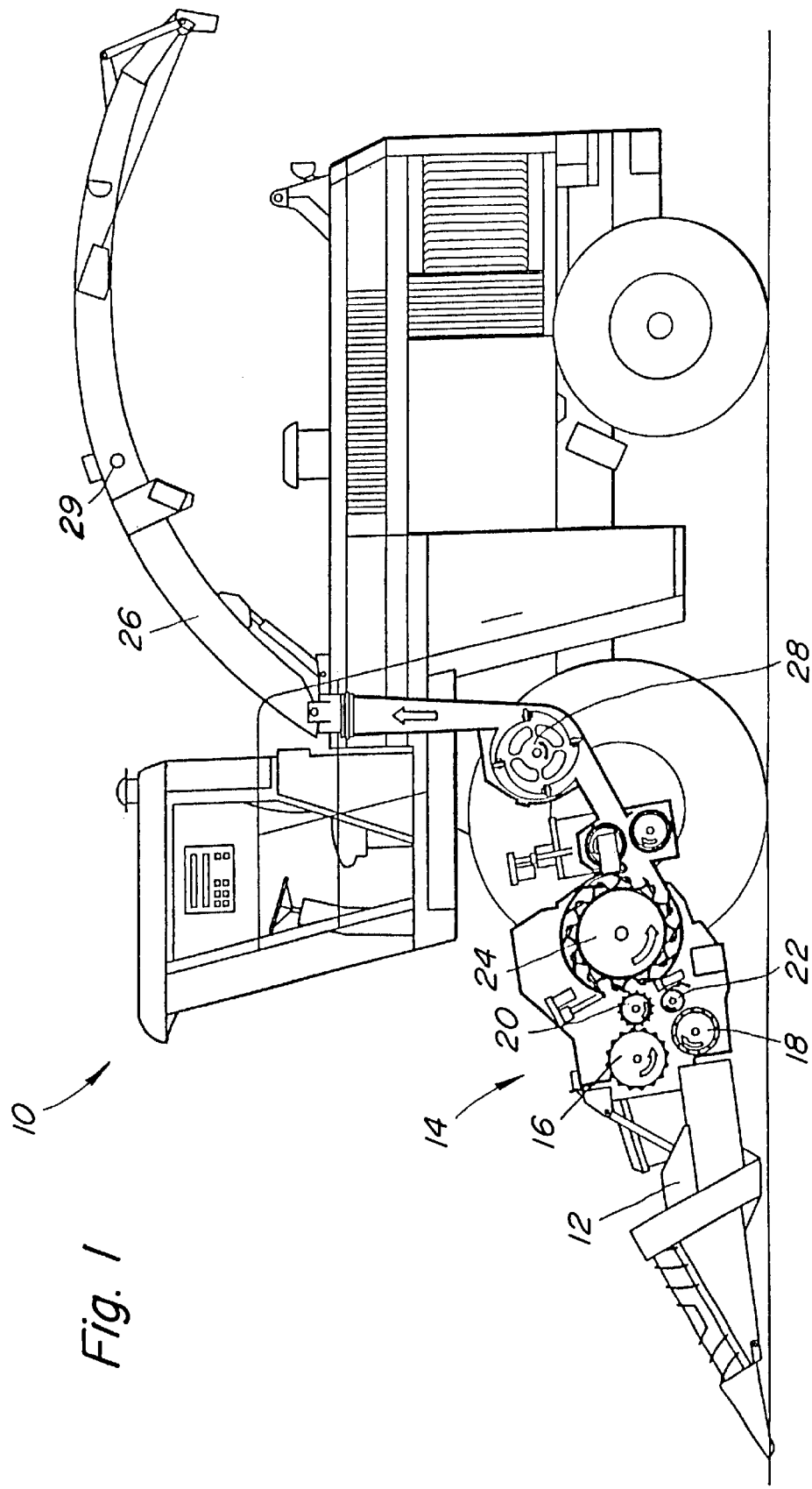
FIG. 1 shows a side view of a self-propelled forage harvester with a throughput measurement device according to the invention.

FIG. 1 reveals an agricultural machine for the collection and processing of crop, in particular, a self-propelled forage harvester 10 with a front harvesting attachment 12 and a crop supply arrangement 14, that is formed by several pre-compression rolls a forward pair of upper and lower compression rolls 16 and 18 and a rear pair of upper and lower compression rolls 20 and 22. It is desirable to operate with the most homogeneous crop throughput possible and it has been found that this may be accomplished if the harvesting attachment 12 is a corn picker operating independent of rows. In any event, from the front harvesting attachment 12, the crop is forced in a direction A through a compression channel formed by the pre-compression rolls 16, 18, 20 and 22 to a knife or chopper drum 24. Here the crop is cut and conducted further in a direction B toward a discharge chute or spout 26. Located between the knife drum 24 and the discharge chute 26 is a blower 28 which accelerates the cut crop at the point where it enters the discharge chute or spout 26. A light barrier 29 is arranged in the discharge chute 26 for detecting whether or not crop flow exists.

Figure 2:
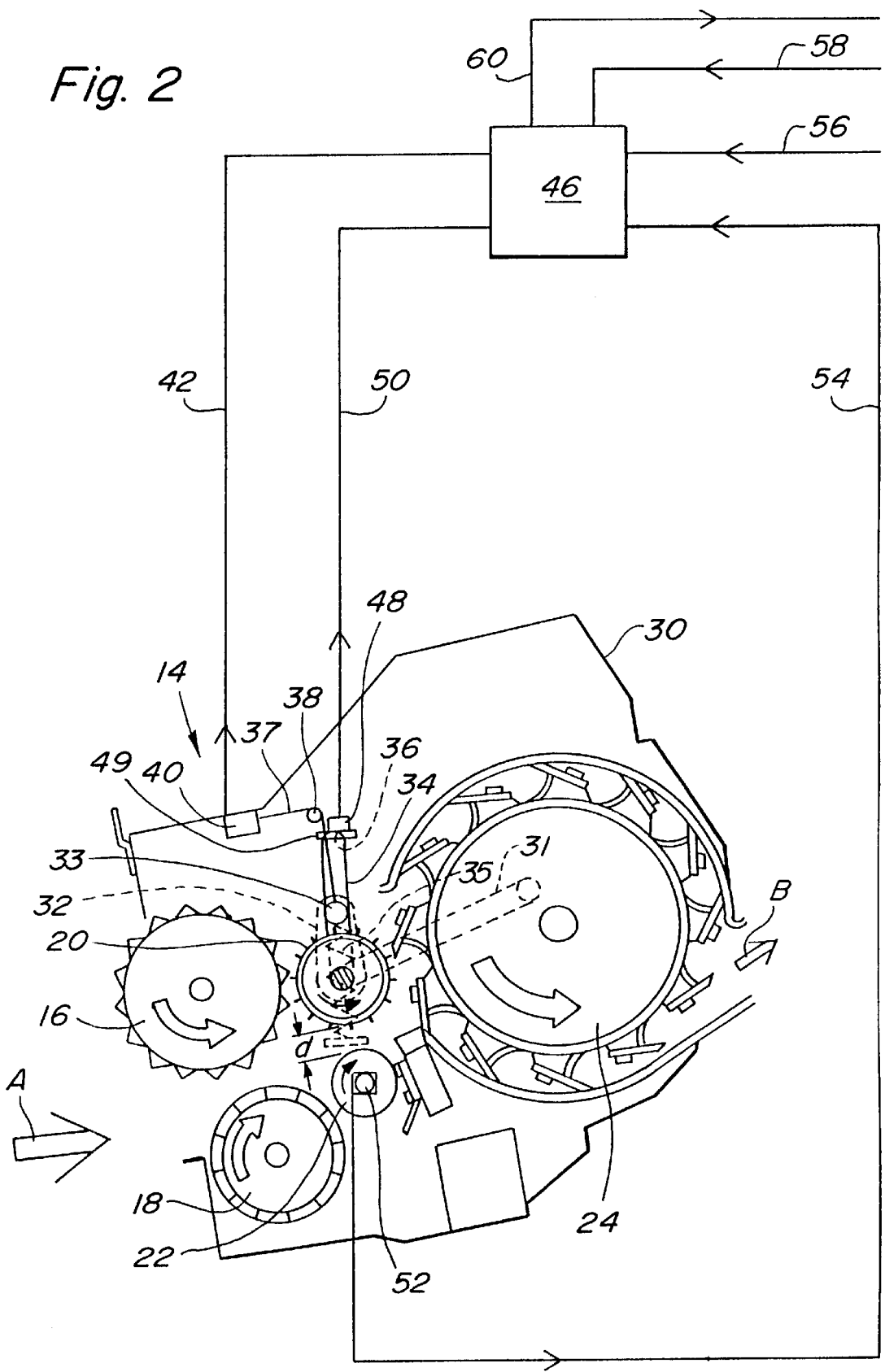
FIG. 2 shows the intake housing of a forage harvester with a throughput measurement device according to the invention.

FIG. 2 shows details of the crop supply arrangement 14 and the chopper drum 24 that are arranged in an intake housing 30. The front set of pre-compression rolls 16 and 18 begin compressing the crop as it passes therebetween, with further compression and conveying of the crop being performed by the two rear pre-compression rolls 20 and 22 that are spaced from one another by a variable spacing d. Preferably, the pre-compression roll 20 is arranged generally vertically above the pre-compression roll 22. Here the lower pre-compression roll 22 is supported in stationary bearings while the upper pre-compression roll 20 is mounted to a pair of vertically swingable arms 31 extending between opposite ends of the roll axle and a pivot pin located on the frame at the opposite sides of the housing 30. Located at each of the opposite ends the roll axle is a flange 32 having upper ends joined by a transverse strut or leveling rod 33. Opposite ends of the axle of the roll 20 and of the. leveling rod 33 are located in a pair of clearance slots 34 respectively provided in the opposite side walls of the housing 30 and disposed arcuately about the pivot axis of the arms 31. Coupled between the frame and the opposite ends of the leveling rod 33 are a pair of helical extension springs 35, which are not absolutely necessary. Thus, the upper pre-compression roll 20 can deflect increasingly upward against the force of the helical springs 35 and/or gravity with increasing throughput. Upon deflection of the pre-compression roll 22, the width of the gap carrying the crop varies as well as the spacing d between the pre-compression rolls 20 and 22. Here the spring characteristic of the spring arrangement is preferably designed in such a way that the spring force and thereby also the force acting upon the throughput material, increases with increasing deflection of the pre-compression roll 22 and with increasing spacing d between the pre-compression rolls. This produces a greater compression of the crop flow and may be incorporated into the determination of the mass flow in which the spacing value is provided with a corresponding correction, as explained below.

In order to make possible a reliable determination of the variation between the pre-compression rolls, even with a non-uniform material flow along the length of the pre-compression rolls and hence non-uniform gap between the pre-compression rolls, a preferred embodiment of the invention provides that the spacing measurement arrangement be configured in such a way that it measures the spacing between pre-compression rolls in the central region. The structure provided for accomplishing this measurement includes the pair of flanges 32, which are respectively mounted at the opposite ends of the upper rear pre-compression roll 20 in such a way that they do not rotate, and the transverse strut or leveling rod 33. The pre-compression roll 20 can deflect generally in the vertical direction between a lower stop, defined by the bottoms of the slots 34, and an upper stop 36, defined by the upper ends of the slots 34. When the lower stop is reached, the ends of the pre-compression roll axle make contact with the lower ends of the slots 34, while upon reaching the upper stop 36, the ends of the transverse strut 33 make contact with the upper ends of the slots 34. With regard to its longitudinal extent, a rope 37 is attached in the central region of the transverse strut 33 and leads over a deflection pulley 38 to a rope potentiometer 40. Thereby the vertical deflection of the transverse strut 33 and with it also the upper rear pre-compression roll 20 is detected without any further transmission losses, and converted into a measurement value that is a function of the dimension of the gap or space d between the two rear pre-compression rolls 20 and 22. The change in resistance generated in the rope potentiometer 40 is converted by an integrated amplifier into a voltage signal and transmitted over a data line 42 to a processor 46. Preferably the rope potentiometer 40 is designed such that it can cover a lift deflection up to approximately 300 mm.

With increasing crop throughput, the upper pre-compression roll 20 moves upward until it reaches the upper stop 36, which limits the maximum gap d of the passage channel. Even when the axle of the upper pre-compression roll 20 is in contact with the upper stop 36, a higher mass flow can be reached by further compression of the crop. According to a preferred embodiment of the throughput measurement arrangement, a force transducer, here shown as force transducer box 48, is provided adjacent the upper ends of the guide slots 34 at each of the opposite sides of the housing 31 so as to be in the path of movement of the transverse strut 33. An appropriate force transducer, for example, is a type C9B, pressure force transducer rated at 20 kN that is available from the Spectris Company, located in Germany. However, with large harvesting machines, force transducers can be successfully applied whose measurement range lies between 0 and 50 kN. The force transducer 48 may be a force measurement box, as shown, or a bending beam.

The force transducers 48 may be attached at both sides of the intake roll housing 30 in such a way that the transverse strut 33 of the upper pre-compression roll 20 makes contact with the input point of the force transducer 48 as soon as it reaches a position that corresponds to a certain distance from the upper edge (stop 36) of the guide slot 34 of the pre-compression roll 20. Preferably each force transducer 48 is positioned relative to the mechanical end stop 36 of the pre-compression roll 20 such that it responds approximately 5 mm. before the strut 33 reaches the stop 36. The signals of the two force transducers 48 are sent to the processor 46 over data lines 50 and can be averaged and processed further in the processor 46 as a common force transducer signal. Even in the case of a non-uniform crop throughput along the pre-compression rolls 20 and 22, in which the width of the gap between the pre-compression rolls is not uniform, a relatively exact determination of the pressure applied to the crop is obtained.

Because the force transducer boxes 48 absorb the force by means of which the upper pre-compression roll 20 is forced upward at very high throughput, protection of each transducer box 48 from overloading is desired and may be provided by locating an elastomeric pad 49 in the region of the contact surface of the transducer box 48.

An impulse sensor 52 measures the rotational speed of the lower pre-compression roll 22. This measured rotational speed value is proportional to the speed of the material flow in the intake channel between the two rear pre-compression rolls 20 and 22 and is transmitted over a data line 54 to the processor 46. The rotational speed signals are generally proportional to the speed of the material flow in the intake channel between the two rear pre-compression rolls 20 and 22.

According to an additional particularly preferred further development of the invention, the light barrier 29 is mounted in the discharge spout or chute 26, as shown in FIG. 1, for the purpose of monitoring the ejected material flow. The signal of the light barrier 29 is used in particular at that time for the determination of the crop throughput when the pre-compression roll 20 and 22 occupy a minimum spacing to each other. At a minimum spacing between pre-compression rolls 20 and 22, a minimum crop throughput is recorded as long as flow of material is detected in the discharge spout. If no material flow is recorded, the crop throughput is set equal to zero. The signal value of the light barrier 29 is transmitted over a data line 56 to the processor 46. Furthermore, the processor 46 is connected over a data line 58 with an indicator unit, not shown in any further detail, installed in the operator's cab, by means of which, for example, inputs regarding the actual crop and calibrations can be provided. The processor 46 evaluates the signals transmitted to it and transmits the results over at least one data line 60 to an indicator arranged in the operator's cab or to further, in any case not further detailed, control or memory arrangements.

From the signals transmitted to it, the processor 46 calculates the mass flow $M_t$. It has been shown to be particularly advantageous to determine the mass flow $M_t$ on the basis of the following relationship:

$$M_t = k^*(d_1+d_2+d_3)^*\omega$$

with $d_1 = \frac{1}{2}^* d_{min} ^* $ f(Boolean)
$d_2 = f(F)^* d_{max} + f$ Spring
$d_3 = f(F)$ Where k is a calibration constant that can be determined by tests; $\omega$ is a measured value of the speed sensor, in particular the rotational speed of the pre-compression roll 22; $d_1$, $d_2$, and $d_3$ are derived roll spacing values; $d_{min}$ is a minimum spacing between the pre-compression rolls 20 and 22; $d_{max}$ is a maximum spacing between pre-compression rolls 20 and 22; f(Boolean) is a logical function on the basis of which a light barrier signal is evaluated; f(R) is a roll spacing value derived from the spacing measurement arrangement and normalized for the maximum roll spacing $d_{max}$; f(spring) is a value derived from the spring characteristic of the pre-compression roll spring arrangement as a function of the roll spacing value; and f(F) is an adjustment force value derived from one or more force transducers 48. The values f(R), f(F) and k may depend upon the particular crop being processed. For example, in various types of crop, different densities can be reached, so that in the processor 46 values specific to different crops are stored, that flow into the constants and functions for the calculation of the mass throughput. A function can also be stored in the processor 46 for the compressibility of the crop.

With a calibrated system, the operator uses an input only to specify the type of crop to be harvested and humidity conditions, if required. In the processor 46, the associated constants and functions are then automatically selected for the calculation of the mass throughput. With the values of the throughput calculated by means of the processor 46 and other data (position, operating speed, scope of the work) the data of the proceeds can be determined and a chart of the proceeds can be filled out.

From the signals transmitted to it, the processor 46 calculates the mass flow $M_t$. The calculation may be performed, for example, on the basis of the flow chart shown in FIG. 3. Upon starting in step 100, an initialization is performed in which the time t and the mass flow to be determined, $M_t$ are set equal to zero. In step 102, the value of time is increased by a unit of time. Then the algorithm tests in step 104 whether the light barrier 30 registers a flow of material. If no flow of material is found, then in step 106 values $d_1$, $d_2$, and $d_3$ are set equal to zero and the process continued in step 108. In this case, the result is a mass flow $M_t=0$.

If, on the other hand, the light barrier 29 registers a mass flow, then the algorithm continues with step 110 in which it is determined whether the output signal of the rope potentiometer 40 is greater than zero. If this is not the case, then the upper pre-compression roll 20 is in contact with the lower stop. Since in this case, a small gap remains between the pre-compression rolls 20 and 22, a small mass flow is possible, that is determined by the light barrier 29. This mass flow is so small in comparison to the mass flows in normal operation, that it can be considered by an average value as an approximation without falsifying the total measurement significantly. If the output signal of the rope potentiometer is zero, than in step 112, therefore the value of $d_1=d_{MIN}/2$ and the values $d_2=d_3$ are set to equal zero, and the process is continued with step 108. This has the result that a constant minimum mass flow $M_t$ is issued.

If the flow of material is so great that it lifts the upper pre-compression roll 20 so that it no longer is in contact with its lower stop, then the rope potentiometer transmits a signal greater than zero. In this case, the step 110 takes the algorithm to step 114. In step 114, the signals of the force transducer boxes 48 is verified. If these are zero, this means that the upper pre-compression roll 20 had not yet been raised into the region of the upper stop 35 by the flow of material. If this is the case, then in step 116 the values $d_1=d_{min}/2$, $d_2=f(R)^*d_{max}$ and $d_3$ equal to zero, and the process continues with step 108. The operating range between the lower and the upper stops is considered by means of the value $d_2$, that establishes a linear relationship between the roll spacing and the mass flow.

If, however, the upper pre-compression roll 20 is raised by the flow of material to such a degree that it comes into the range of the upper stop 36, at which point the transverse strut 33 comes into contact with at least one force transducer box 48 and applies a force to this, then a force transducer signal results that is not equal to zero. In this case, in step 118, the values $d_1=d_{min}/2$, $d_2=f(R)^*d_{MAX}$ and $d_3=f(F)$, and then the process continues with step 108. The operating range in which the upper pre-compression roll 20 is located in the region of the upper stop 36, is covered by the measurement of the contact pressure of the upper roll 20 on the upper stop 36, which can generally be seen as proportional to the possible further deflection of the roll 20.

In step 108, the values $d_1$, $d_2$ and $d_3$ are added to produce a value $d_{total}$. In step 120, the mass flow $M_t$ is then calculated in which the value $d_{total}$ is multiplied by the output signal $\omega$ of the impulse sensor 52 as well as by a calibration constant k. Step 122 issues the mass flow $M_t$ thus determined and returns the algorithm to step 102, in which the time is again increased by a unit of time. The algorithm described can be automatically performed several times a second.

Although the invention has been described in terms of one embodiment, anyone skilled in the art will perceive many varied alternatives, modifications and variations in light of the above description as well as the drawings, all of which fall under the present invention.

What is claimed is:

1. In combination with an agricultural crop harvesting machine including at least one pair of upper and lower pre-compression rolls that guide the harvested crop between them, with the upper pre-compression roll being mounted for moving vertically, relative to the lower pre-compression roll, between lower and upper limit positions in response to variations in thickness of a mat of crop passing between said rolls, a crop throughput measuring device, comprising: a spacing measurement arrangement for detecting the distance between said upper and lower pre-compression rolls and generating a spacing signal representative of said distance; a speed sensor for monitoring the speed of rotation of said lower pre-compression roll and producing a speed signal representative of said speed; at least one force transducer arranged in a region adjacent said upper limit position of said upper pre-compression roll for sensing forces with which said upper pre-compression roll is forced upwardly and generating a force signal representative of said forces; and a control unit coupled for receiving said space, speed and force signals and calculating a crop mass throughput value based on said space, speed and force signals.

2. The combination defined in claim 1 wherein a second force transducer is used in conjunction with said at least one force transducer with the two transducers being located at opposite ends of said upper pre-compression roll when the latter is located at its upper limit position; and each of the two transducers cooperating to produce said force signal.

3. The combination defined in claim 1 wherein said upper limit position of said upper pre-compression roll is defined by an upper limit stop; and said at least one force transducer being configured and arranged in such a way that it responds approximately 5 mm. before said upper pre-compression roll reaches said upper limit stop.

4. The combination defined in claim 1 wherein said at least one force transducer has a measurement range that lies approximately between 0 and 50 kN.

5. The combination defined in claim 1 wherein said upper pre-compression roll forms part of an assembly which rises and falls with said pre-compression roll; said at least one force transducer has a contact surface located for engagement by said assembly; and an elastomeric pad being applied to said contact surface thereby providing overload protection for said at least one force transducer.

6. The combination defined in claim 1 wherein said upper pre-compression roll forms part of an assembly including a strut spaced from, and disposed parallel to, said upper pre-compression roll; and said spacing measurement arrangement including means for measuring the spacing between a central region of said upper pre-compression roll and said lower pre-compression roll by measuring the rise and fall of a central region of said strut.

7. The combination defined in claim 6 wherein said spacing measurement arrangement is a rope potentiometer including a displacement transfer rope coupled to a central region of said strut.

8. The combination defined in claim 7 wherein said potentiometer includes signal producing means working in conjunction with said rope so as to detect a rise in said upper pre-compression roll of up to approximately 300 mm.

9. The combination defined in claim 1 wherein said speed sensor is an impulse sensor.

10. The combination defined in claim 1 wherein said crop harvesting machine includes a discharge chute for carrying cut crop at a point downstream from said pre-compression rolls; and said throughput measuring device including at least one light barrier mounted for monitoring whether or not any crop material is exiting the machine and generating a crop flow signal indicative of the presence or non-presence of exiting crop; and said crop flow signal being coupled to said control unit for being processed such that said crop throughput is calculated to be zero when no exiting crop is detected by said light barrier and such that said crop throughput is calculated to be a minimum amount when exiting crop is detected and said upper pre-compression roll is located at said lower limit position.

11. The combination defined in claim 1 and further including a spring arrangement resisting upward movement of said upper pre-compression roll from said lower limit position and having a spring constant; and said control unit including a spring characteristic input where a signal representative of said constant may be placed into memory for acting together with said spacing signal for establishing changes in the calculated crop throughput value such that the value increases with increasing compression by the spring arrangement of the crop passing between the upper and lower pre-compression rolls.

12. A method for determining crop throughput on an agricultural harvesting machine of a type including upper and lower pre-compression rolls with the upper roll being mounted for moving relative to the lower roll between lower and upper limit positions, comprising: instantaneously measuring the spacing between said upper and lower rolls; generating a signal representative of said spacing; measuring the speed of crop flow between said upper and lower rolls and generating a speed signal representative of said speed; obtaining a measurement of the upward force exerted by said upper pre-compression roll due to said crop flow when the latter causes said upper pre-compression roll to approach said upper limit position and generating a signal representative of said force; and processing said spacing, speed and force signals so as to determine the crop mass throughput, with said force signal being used to increase the throughput value as a function of increased force.

13. The method as defined in claim 12 and further including the step of determining whether or not material is flowing downstream from said pre-compression rolls and generating a signal representing representing a minimum constant throughput when material is flowing and the signal representing the spacing between the pre-compression rolls is at a minimum measured spacing, and for generating a signal representing no throughput when no material is flowing.

14. The method as defined in claim 12 wherein upward movement of said upper pre-compression roll is resisted by a spring device; and generating a signal representing the spacing of the upper pre-compression roll from the lower pre-compression roll as a function of a spring constant of said spring device.

* * * * *